United States Patent
Yamamoto et al.

(10) Patent No.: US 11,933,964 B2
(45) Date of Patent: Mar. 19, 2024

(54) OPTICAL SCANNING APPARATUS AND IMAGE FORMING APPARATUS

(71) Applicant: SHARP KABUSHIKI KAISHA, Sakai (JP)

(72) Inventors: Hiroshi Yamamoto, Sakai (JP); Hidenori Sato, Sakai (JP); Takaharu Motoyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 371 days.

(21) Appl. No.: 17/367,518

(22) Filed: Jul. 5, 2021

(65) Prior Publication Data

US 2022/0019076 A1     Jan. 20, 2022

(30) Foreign Application Priority Data

Jul. 15, 2020   (JP) .................................. 2020-121302

(51) Int. Cl.
*G02B 26/08* (2006.01)
*G02B 5/30* (2006.01)
(Continued)

(52) U.S. Cl.
CPC ....... *G02B 26/0833* (2013.01); *G02B 5/3083* (2013.01); *G02B 26/10* (2013.01); *G02B 27/283* (2013.01)

(58) Field of Classification Search
CPC .. G02B 26/0833; G02B 5/3083; G02B 26/10; G02B 27/283
(Continued)

(56) References Cited

U.S. PATENT DOCUMENTS 5,790,275 A * 8/1998 Iizuka .................... H04N 1/207
                                                          358/300
7,999,915 B2 * 8/2011 Ershov ................ G03F 7/70625
                                                          355/53
(Continued)

FOREIGN PATENT DOCUMENTS

JP       S60-205419 A     10/1985
JP       2003285188 A     10/2003
(Continued)

Primary Examiner — Joseph P Martinez
Assistant Examiner — Grant A Gagnon
(74) Attorney, Agent, or Firm — ScienBiziP, P.C.

(57) ABSTRACT

An optical scanning apparatus includes a first polarizing member and a second polarizing member between a light source and a MEMS mirror that is a deflection mirror. The first polarizing member reflects a first polarization component included in a beam light emitted from the light source so as to squarely enter the MEMS mirror and passes a second polarization component having a phase difference of a half-wavelength with respect to the first polarization component. The second polarizing member is provided between the first polarizing member and the MEMS mirror to pass the first polarization component reflected by the first polarizing member therethrough twice before and after being reflected by the MEMS mirror to change the first polarization component into the second polarization component. A rotation axis of the MEMS mirror is parallel to an optical axis of the beam light immediately before being reflected by the first polarizing member.

7 Claims, 9 Drawing Sheets

(51) Int. Cl.
*G02B 26/10* (2006.01)
*G02B 27/28* (2006.01)

(58) Field of Classification Search
USPC .......................................................... 359/200
See application file for complete search history.

(56) References Cited

U.S. PATENT DOCUMENTS

| 2012/0044556 | A1 | 2/2012 | Yamada |
| 2013/0003022 | A1 | 1/2013 | Tanaka et al. |
| 2017/0285238 | A1 | 10/2017 | Hirshberg et al. |

FOREIGN PATENT DOCUMENTS

| JP | 2011090188 | A | 5/2011 |
| JP | 2012042878 | A | 3/2012 |
| JP | 2013041236 | A | 2/2013 |
| JP | 2014103597 | A | 6/2014 |
| WO | 2016204267 | A1 | 12/2016 |

* cited by examiner

OPTICAL SCANNING APPARATUS AND IMAGE FORMING APPARATUS

BACKGROUND OF THE INVENTION

Field of the Invention

The present invention relates to an optical scanning apparatus and an image forming apparatus including the optical scanning apparatus.

Description of the Background Art

There are conventionally known optical scanning apparatuses that include an optical system including a light source and a deflection mirror such as a polygon mirror or a micro-electro-mechanical systems (MEMS) mirror to reflect a beam light from the light source by the deflection mirror and scan a scanned object.

In order to prevent interference with emitted light rays after being reflected by the deflection mirror, the optical scanning apparatus often adopts a light ray layout in which a beam light enters the deflection mirror not squarely but obliquely from the side.

Furthermore, in order to prevent the beam light from falling outside the deflection mirror, the optical scanning apparatus needs to ensure a vignetting margin that allows for an error in the irradiation position of the beam light with respect to the deflection mirror.

In the light ray layout where the beam light enters the deflection mirror obliquely from the side, however, the effective area of the reflection surface is narrow at a certain angle of the deflection mirror, which causes difficulty in ensuring a vignetting margin. In particular, when a MEMS mirror is used as a deflection mirror, there is the issue of the difficulty in ensuring a vignetting margin due to the small mirror size in the main scanning direction as compared to a polygon mirror.

As a layout different from the above-described light ray layout, there is also a known light ray layout in which a beam light squarely enters a deflection mirror at an angle with respect to the rotation axis of the deflection mirror. In this light ray layout, as the beam light squarely enters the deflection mirror, it is easy to ensure a vignetting margin.

In the light ray layout in which the beam light enters at an angle with respect to the rotation axis of the deflection mirror, however, the optical path of the beam light also extends in the direction of the rotation axis of the deflection mirror, which causes the issue of an increase in the thickness of the optical scanning apparatus. Furthermore, as the reflection position of the beam light is different between the image height center and the scanning end, there is also the issue of the occurrence of a sub-scanning line bow of a reflected light ray.

Japanese Unexamined Patent Publication No. 60-205419 discloses a light ray layout in which a prism and a quarter wavelength plate form the optical path of a beam light from lower incidence to upper incidence. In this light ray layout, however, a deflection mirror (here, a polygon mirror) needs to reflect the beam light twice on one reflection surface, and the distance between the two reflection points becomes long in the main scanning direction at a certain angle of the deflection mirror, which causes the issue of an increase in the size of the deflection mirror as compared to the conventional one rather than ensuring a vignetting margin.

An object of the present invention is to provide an optical scanning apparatus and an image forming apparatus including the optical scanning apparatus with which it is possible to cause a beam light to squarely enter a deflection mirror, ensure a vignetting margin, and minimize a bow.

SUMMARY OF THE INVENTION

In order to solve the above-described issue, an optical scanning apparatus according to a first aspect of the present invention includes: a light source that emits a beam light including a first polarization component; a deflection mirror that is rotationally driven so as to reflect the beam light toward a scanned object while scanning in a main scanning direction; a first polarizing member that reflects the first polarization component included in the beam light toward the deflection mirror and passes a second polarization component having a phase difference of a half-wavelength with respect to the first polarization component; and a second polarizing member that causes a phase difference of a quarter wavelength to the passing beam light, wherein the first polarizing member is provided such that the beam light reflected by the first polarizing member squarely enters the deflection mirror from substantially a center of a deflection angle of the deflection mirror, the second polarizing member is provided between the first polarizing member and the deflection mirror to pass the first polarization component of the beam light reflected by the first polarizing member therethrough twice before and after being reflected by the deflection mirror so as to change the first polarization component into the second polarization component, and a rotation axis of the deflection mirror is parallel to an optical axis of the beam light immediately before being reflected by the first polarizing member.

With the above-described configuration, the provision of the first polarizing member and the second polarizing member makes it possible to cause the beam light to squarely enter the deflection mirror, ensure a vignetting margin, and minimize a bow. Although the beam light squarely entering the deflection mirror is reflected toward the incident side, the optical paths of the beam lights before and after being reflected by the deflection mirror may be separated due to the optical functions of the first polarizing member and the second polarizing member.

Furthermore, the above-described optical scanning apparatus may be configured to include a reflection mirror that is provided on an opposite side of the second polarizing member and the deflection mirror with respect to the first polarizing member to reflect the beam light such that an optical axis of a central scanning light of the beam light having passed through the first polarizing member after passing through the second polarizing member twice is parallel to an optical axis of the beam light immediately before being reflected by the first polarizing member.

With the above-described configuration, as the reflection mirror is provided, the optical axis of the beam light immediately before being reflected by the first polarizing member may be parallel to the optical axis of the central scanning light of the beam light having passed through the first polarizing member after passing through the second polarizing member twice. Thus, the optical scanning apparatus may be reduced in thickness and size.

Further, the above-described optical scanning apparatus may be configured to include a light shield that blocks the second polarization component included in the beam light emitted by the light source and passing through the first polarizing member before being reflected by the deflection mirror.

With the above-described configuration, it is possible to block the second polarization component that is not used for scanning the scanned object and prevent the second polarization component from being emitted from the optical scanning apparatus.

Furthermore, the above-described optical scanning apparatus may have a configuration such that the first polarizing member and the reflection mirror are formed as an integral prism in which a dielectric multi-layer film is formed on one surface of a triangular prism and a mirror coat is formed on another surface of the triangular prism.

With the above-described configuration, as the first polarizing member and the reflection mirror are formed as an integral prism, the arrangement, or the like, of members during the assembly of the optical scanning apparatus is facilitated.

Further, the above-described optical scanning apparatus may have a configuration such that the first polarizing member and the second polarizing member are formed as an integral prism in which a dielectric multi-layer film is formed on one surface of a triangular prism and a quarter wavelength plate is attached to another surface of the triangular prism.

With the above-described configuration, as the first polarizing member and the second polarizing member are formed as an integral prism, the arrangement, or the like, of members during the assembly of the optical scanning apparatus is facilitated.

Further, the above-described optical scanning apparatus may have a configuration such that the deflection mirror is a MEMS mirror.

Moreover, in order to solve the above-described issue, an image forming apparatus according to a second aspect of the present invention includes the above-described optical scanning apparatus.

The optical scanning apparatus and the image forming apparatus according to the present invention produce an advantageous effect such that it is possible to cause the beam light to squarely enter the deflection mirror, ensure a vignetting margin, and minimize a bow due to the optical functions of the first polarizing member and the second polarizing member.

DESCRIPTION OF THE PREFERRED EMBODIMENTS

First Embodiment

Figure 1:
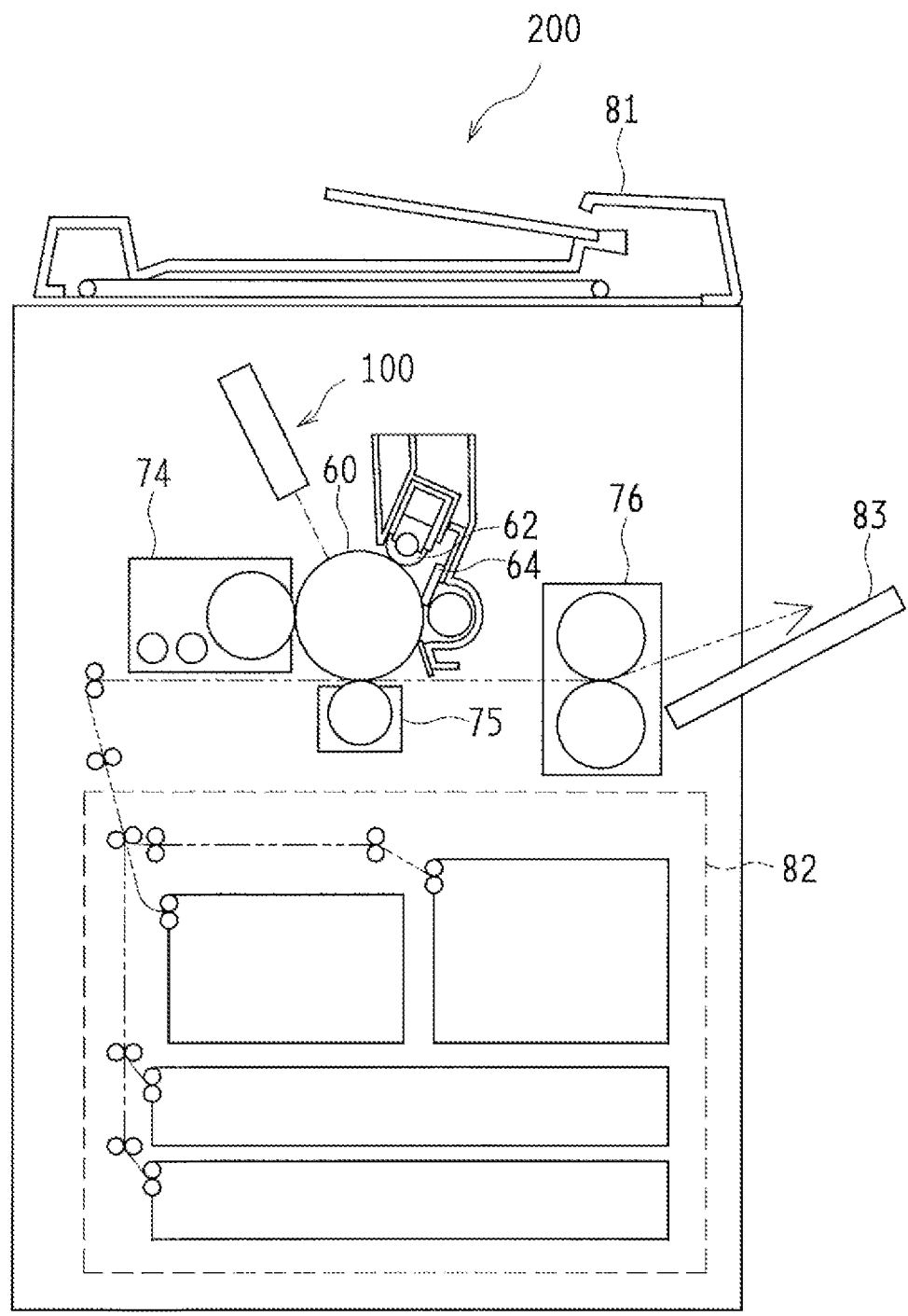
FIG. 1 is a vertical cross-sectional view schematically illustrating an overall configuration of an image forming apparatus to which an optical scanning apparatus according to a first embodiment is applied.

An embodiment of the present invention will be described below in detail with reference to the drawings. FIG. 1 is a vertical cross-sectional view schematically illustrating an overall configuration of an image forming apparatus 200 to which an optical scanning apparatus 100 according to the present embodiment is applied. The image forming apparatus 200 illustrated in FIG. 1 is a digital multifunction peripheral capable of printing a document read by a scanner 81 or printing image data input from an external machine via a network.

The image forming apparatus 200 includes a photoconductor drum 60, a charging unit 62, a cleaning unit 64, the optical scanning apparatus 100, a developing unit 74, a transfer unit 75, a fixing unit 76, the scanner 81, a paper feed tray 82, and a paper discharge tray 83.

The scanner 81 includes a document set tray, an automatic document feeder, a document read device, and the like. The document read device includes a document placement table and a document scanning device.

The paper feed tray 82 is a tray accommodating recording paper such as regular paper, coated paper, color copier paper, or OHP films. The multiple paper feed trays 82 are provided, and the respective paper feed trays 82 accommodate, for example, recording paper having different sizes. The recording paper having an image formed thereon is discharged to the paper discharge tray 83.

Figure 2:
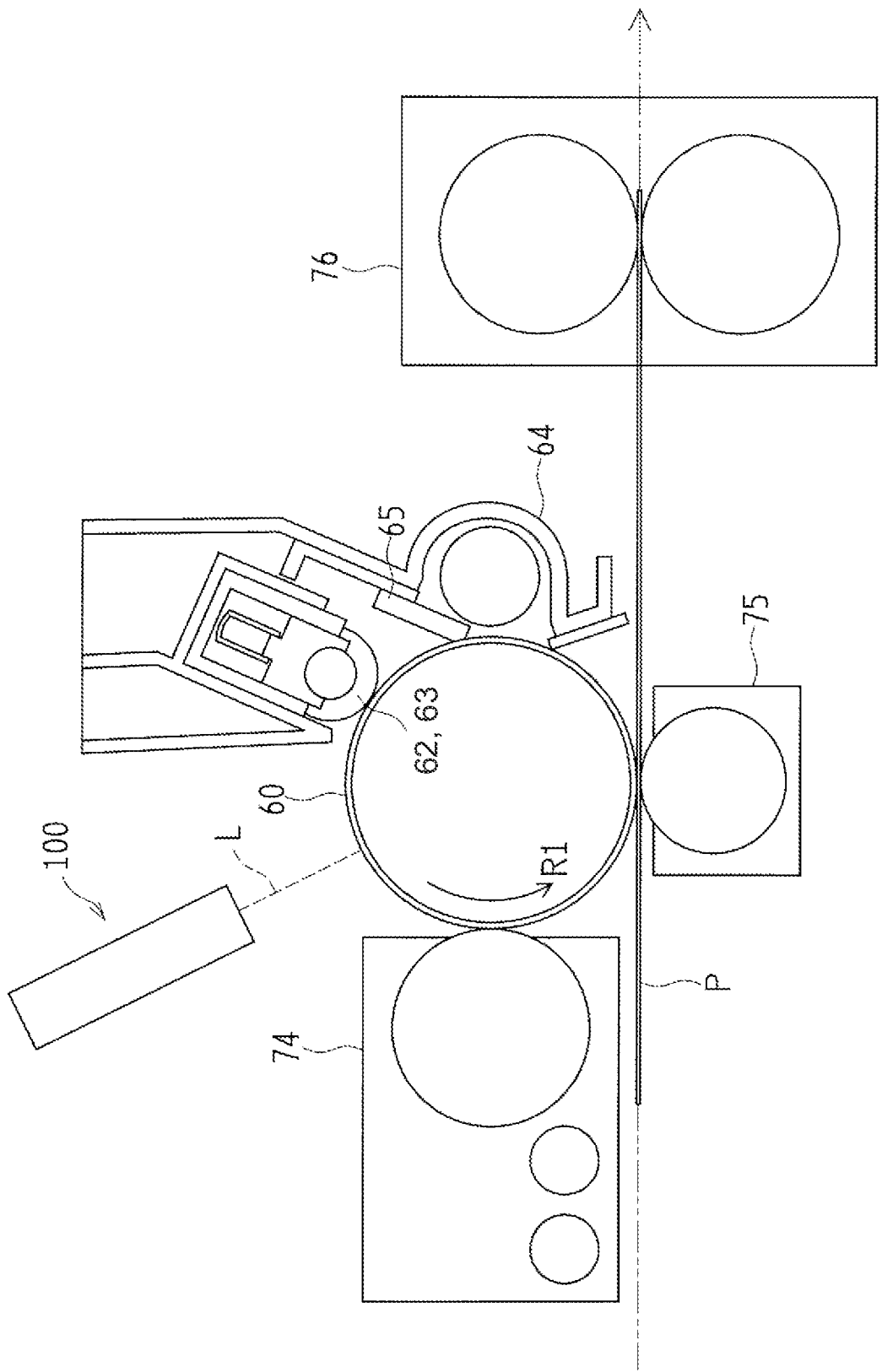
FIG. 2 is a diagram schematically illustrating a configuration around a photoconductor drum in the image forming apparatus.

FIG. 2 is a diagram schematically illustrating a configuration around the photoconductor drum 60 in the image forming apparatus 200 (see FIG. 1). As illustrated in FIG. 2, the charging unit 62, the cleaning unit 64, the optical scanning apparatus 100, the developing unit 74, the transfer unit 75, and the fixing unit 76 are provided around the photoconductor drum 60.

The photoconductor drum 60 is a roller-shaped member provided to be driven and rotated in a direction of an arrow R1. On the surface of the photoconductor drum 60, a photosensitive film is formed, on which an electrostatic latent image and a toner image are formed.

The charging unit 62 charges the outer peripheral surface of the photoconductor drum 60 so as to have a predetermined polarity and electric potential. The charging unit 62 according to the present embodiment is a charging roller 63. The charging roller 63 comes into contact with the outer peripheral surface of the photoconductor drum 60 to charge the photoconductor drum 60.

The cleaning unit 64 removes residual toner remaining on the outer peripheral surface of the photoconductor drum 60. The cleaning unit 64 includes a cleaning blade 65.

The optical scanning apparatus 100 (see FIG. 1) irradiates the charged photoconductor drum 60 with a beam light L corresponding to image data. The beam light L with which the outer peripheral surface of the photoconductor drum 60 is irradiated forms an electrostatic latent image corresponding to the image data.

The developing unit 74 supplies toner to the outer peripheral surface of the photoconductor drum 60 to develop an electrostatic latent image formed on the outer peripheral surface of the photoconductor drum 60 as a toner image.

The transfer unit 75 applies a transfer bias to the back surface of recording paper P passing between the photoconductor drum 60 and the transfer unit 75 to transfer the toner image developed on the outer peripheral surface of the photoconductor drum 60 onto the recording paper P.

The fixing unit 76 applies heat and pressure to the recording paper P passing through a fixing nip portion to melt and fix the toner image transferred onto the recording paper P.

Figure 3:
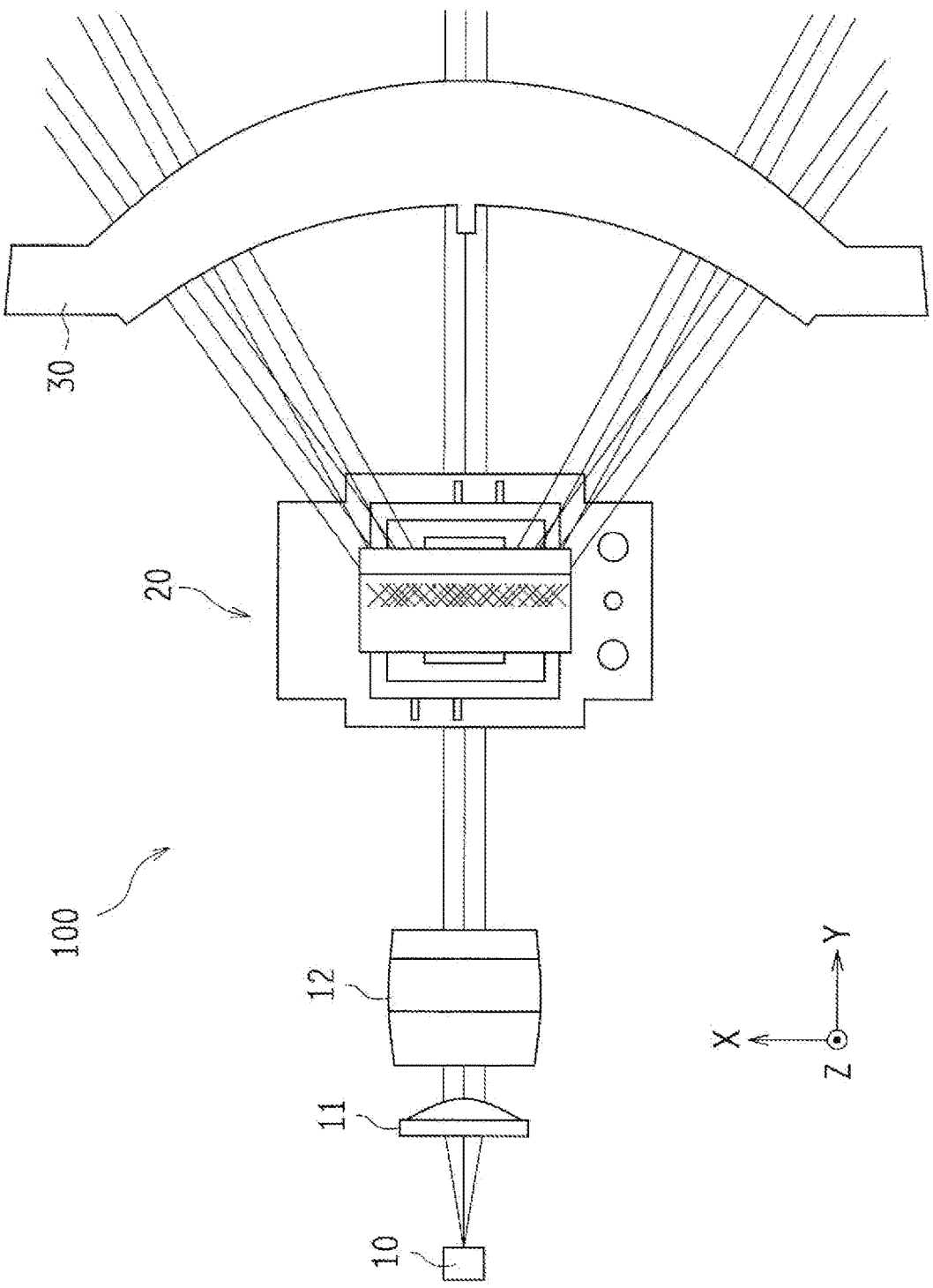
FIG. 3 is a plan view schematically illustrating an optical system of the optical scanning apparatus according to the first embodiment.
Figure 4:
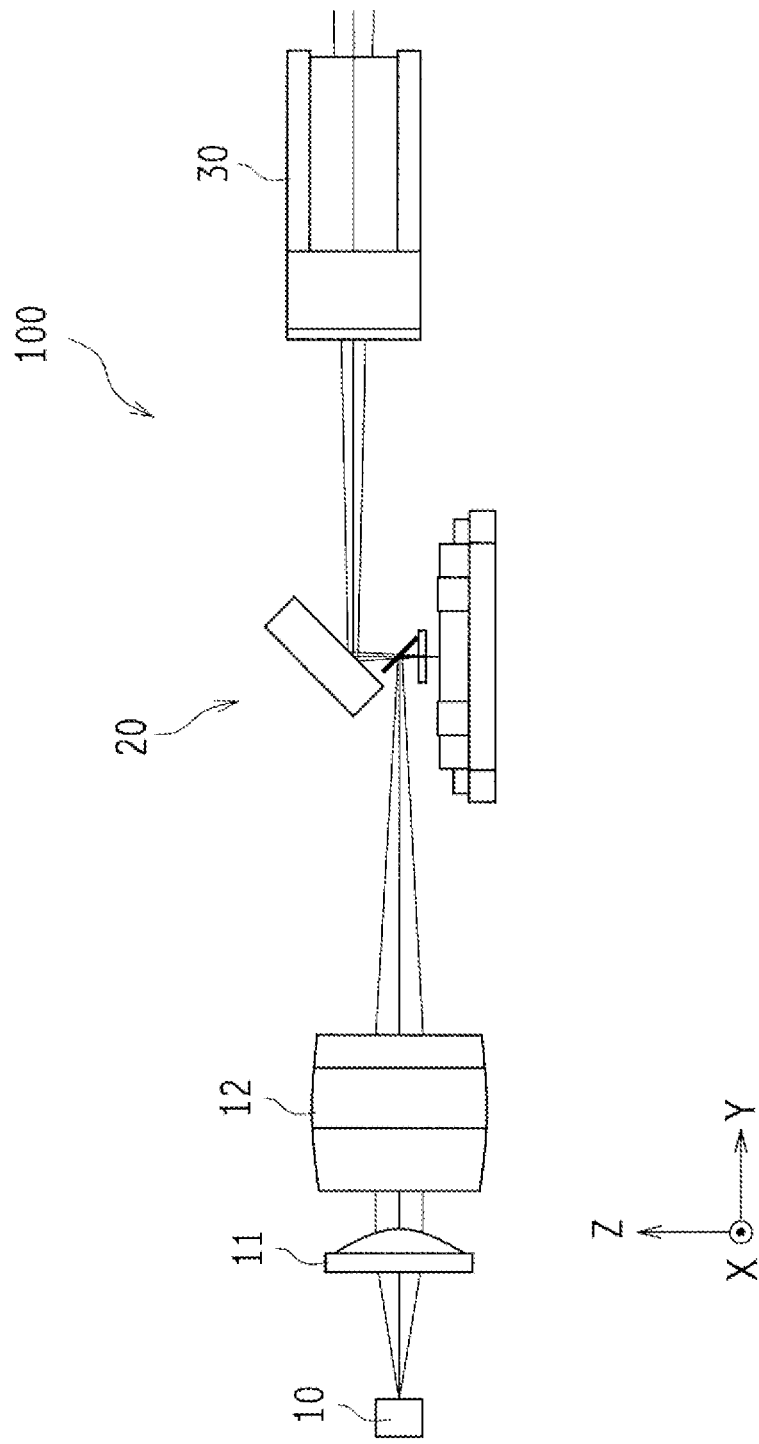
FIG. 4 is a side view schematically illustrating the optical system of the optical scanning apparatus according to the first embodiment.
Figure 5:
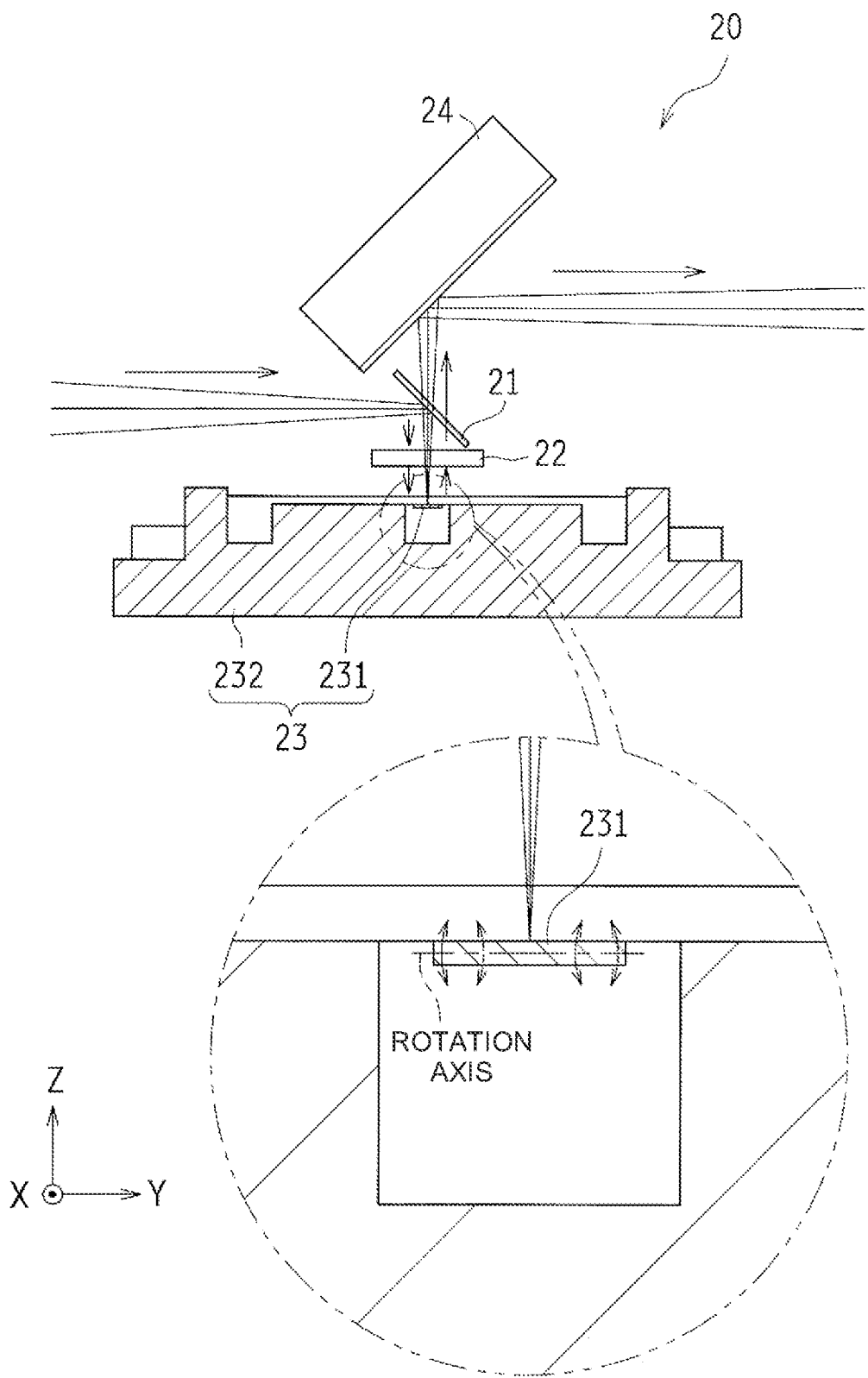
FIG. 5 is a cross-sectional view of a beam deflector included in the optical scanning apparatus according to the first embodiment.

FIG. 3 is a plan view schematically illustrating an optical system of the optical scanning apparatus 100. FIG. 4 is a side view schematically illustrating the optical system of the optical scanning apparatus 100. FIG. 5 is a cross-sectional view of a beam deflector 20 included in the optical scanning apparatus 100 and is a Y-Z cross-sectional view of an area including the beam light L emitted from a light source 10. The optical scanning apparatus 100 is an apparatus that deflects the beam light L emitted from the light source 10 in a main scanning direction by using a deflection mirror to scan a scanned object (the photoconductor drum 60). In these figures, the main scanning direction of the beam light L is an X-axis direction, an optical axis direction of the beam light L emitted from the light source 10 is a Y-axis direction, and a direction perpendicular to the X-axis direction and the Y-axis direction is a Z-axis direction.

As illustrated in FIGS. 3 and 4, the optical scanning apparatus 100 includes the light source 10, a collimating lens 11, a cylindrical lens 12, the beam deflector 20, and an emission lens 30. In the following description, an optical system (i.e., the light source 10, the collimating lens 11, and the cylindrical lens 12) provided on the incident side of the beam light L with respect to the beam deflector 20 is referred to as an incidence optical system, and an optical system provided on the emission side of the beam light L is referred to as an emission optical system. Although only the emission lens 30 is illustrated as the emission optical system in FIG. 3, the emission optical system may include other lenses and mirrors.

The light source 10 emits the beam light L corresponding to input image data. For example, a laser diode (LD) or a light emitting diode (LED) may be used as the light source 10.

According to the present embodiment, an LD is used as the light source 10 and is rotationally adjusted in an orientation such that an s-polarization component enters the beam deflector 20. A p-polarization component is a polarization component having a phase difference of a half-wavelength with respect to the s-polarization component. Here, the s-polarization component corresponds to a first polarization component according to the present invention, and the p-polarization component corresponds to a second polarization component according to the present invention.

The collimating lens 11 is an optical member that converts the conical beam light L, which is diffusely emitted from the light source 10, into the parallel beam light L. The cylindrical lens 12 is an optical member that focuses the beam light L, which has been changed to a parallel light by the collimating lens 11, in a sub-scanning direction.

As illustrated in FIG. 5, the beam deflector 20 includes a first polarizing member 21, a second polarizing member 22, a MEMS mirror 23, which is a deflection mirror, and a reflection mirror 24, and they are arranged to have a predetermined positional relationship.

The first polarizing member 21 is an optical member that reflects one (the first polarization component) of polarization components included in the beam light L and passes the other one (the second polarization component) and is provided at a position where the beam light L from the incidence optical system first enters. For example, a polarization plate including a wire grid polarizing film, a dielectric multi-layer film, or the like, may be used as the first polarizing member 21. According to the present embodiment, a wire grid polarizing film is used for the first polarizing member 21. The wire grid polarizing film may change polarization components to be reflected and passed depending on the orientation of arrangement. The first polarizing member 21 is arranged in the orientation so as to reflect the s-polarization component included in the beam light L and pass the p-polarization component.

The first polarizing member 21 is arranged such that the reflection/passage surface thereof is parallel to the X-axis direction and the normal to the reflection/passage surface forms an angle of 45° with the Y-axis direction and the Z-axis direction. With this arrangement, the s-polarization component of the beam light L incident on the first polarizing member 21 is reflected so as to bend at 90° from the Y-axis direction to the Z-axis direction. Further, the p-polarization component of the beam light L passes through the first polarizing member 21 and travels straight in the Y-axis direction.

The second polarizing member 22 and the MEMS mirror 23 are provided along the Z-axis direction at the destination to which the beam light L reflected by the first polarizing member 21 travels. The second polarizing member 22 is provided between the first polarizing member 21 and the MEMS mirror 23. The second polarizing member 22 is an optical member that causes a phase difference in the beam light L (the s-polarization component) reflected by the first polarizing member 21. For example, a quarter wavelength plate may be used as the second polarizing member 22. The quarter wavelength plate is a wavelength plate that has the function to cause a phase difference of a quarter wavelength in the incident beam light L and passes the s-polarization component therethrough twice so as to change the s-polarization component into the p-polarization component.

The MEMS mirror 23 includes a drive mirror 231 that is driven to reciprocate and rotate around a rotation axis and a mirror substrate 232 that holds and drives the drive mirror 231. The MEMS mirror 23 reciprocates and rotates the drive mirror 231 to change the direction in which the beam light L is reflected so as to deflect the beam light L in the main scanning direction. Further, the deflection angle (optical deflection angle) of the drive mirror 231 is se as an angle θ.

According to the present embodiment, the rotation axis of the drive mirror 231 is arranged in a direction (i.e., the Y-axis direction) parallel to the optical axis of the beam light L immediately before being reflected by the first polarizing member 21, and the MEMS mirror 23 is provided such that the beam light L squarely enters the drive mirror 231. Here, entering squarely refers to the state where the optical axis of the beam light L incident on the drive mirror 231 matches (is parallel to) the optical axis of the central scanning light (the beam light included in the scanning light having the deflection angle θ and located at the center of the deflection angle θ) in the beam light L (the scanning light) reflected by the drive mirror 231. In other words, to squarely enter, the beam light L enters the drive mirror 231 from substantially the center of the deflection angle θ by the drive mirror 231. The beam light L reflected by the drive mirror 231 is a scanning light deflected on the XZ plane with the optical axis of the central scanning light in the Z-axis direction. Here, entering squarely does not need to be a perfect match between the optical axis of the incident beam light L and the optical axis of the reflected central scanning light and may allow for a slight deviation (e.g., within ±3°).

The beam light L reflected by the drive mirror 231 is reflected back toward the second polarizing member 22, passes through the second polarizing member 22, and reaches the first polarizing member 21 again. Here, the beam light L, which has reached the first polarizing member 21 again, passes through the first polarizing member 21 as the beam light L has passed through the second polarizing member 22 twice before and after being reflected by the drive mirror 231 and therefore the s-polarization component has changed to the p-polarization component.

The reflection mirror 24 is provided at the destination to which the beam light L travels after reaching the first polarizing member 21 again and passing through the first polarizing member 21. That is, the reflection mirror 24 is provided on the opposite side of the second polarizing member 22 and the MEMS mirror 23 with respect to the first polarizing member 21 in the Z-axis direction. Further, the reflection mirror 24 is arranged such that the reflection surface thereof is parallel to the X-axis direction and the normal to the reflection surface forms an angle of 45° with the Y-axis direction and the Z-axis direction. With this arrangement, the beam light L incident on the reflection mirror 24 is reflected such that the optical axis of the central scanning light is bent at 90° from the Z-axis direction to the Y-axis direction and, after the reflection, becomes the scanning light on the XY plane (the optical axis of the central scanning light is parallel to the optical axis of the beam light L immediately before being reflected by the first polarizing member 21). The first polarizing member 21, the second polarizing member 22, and the reflection mirror 24 in the beam deflector 20 are formed with their longitudinal directions in the main scanning direction (the X-axis direction) due to the need to pass or reflect the scanning light after being reflected by the MEMS mirror 23.

The emission lens 30 is a lens that emits the beam light L deflected by the beam deflector 20 (here, the beam light L reflected by the reflection mirror 24) toward the scanned object (the photoconductor drum 60). For example, an Fθ lens or a θ-less lens may be used as the emission lens 30.

According to the present embodiment, as the beam deflector 20 includes the first polarizing member 21 and the second polarizing member 22, the beam light L may squarely enter the deflection mirror (i.e., the MEMS mirror 23). Although the beam light L squarely entering the MEMS mirror 23 is reflected toward the incident side, the optical paths of the beam lights L before and after being reflected by the MEMS mirror 23 may be separated due to the optical functions of the first polarizing member 21 and the second polarizing member 22. As the beam light L squarely enters the MEMS mirror 23, the effective area of the reflection surface (the drive mirror 231) of the MEMS mirror 23 may be maximized, a vignetting margin may be ensured, and a bow may be minimized.

Further, according to the present embodiment, as the beam deflector 20 includes the reflection mirror 24, the optical path in the incidence optical system may be parallel to the optical path in the emission optical system (the optical path of the central scanning light). Thus, the optical scanning apparatus 100 may be reduced in thickness and size. The optical scanning apparatus 100, which is reduced in thickness, has a thickness direction in the Z-axis direction. According to the present invention, however, the reflection mirror 24 of the beam deflector 20 is not essential, and the reflection mirror 24 may be omitted.

Further, according to the present embodiment, in the MEMS mirror 23 of the beam deflector 20, the rotation axis of the drive mirror 231 is arranged in a direction (the Y-axis direction) parallel to the optical axis of the beam light L immediately before being reflected by the first polarizing member 21. With this arrangement, in the drive mirror 231 that reciprocates and rotates (oscillates), the reflection surface of the drive mirror 231 when in the center position of oscillation is on the XY plane. In this case, the primary surface of the mirror substrate 232 in the MEMS mirror 23 is also arranged to be on the XY plane. Further, when the beam deflector 20 includes the reflection mirror 24, the scanning surface of the beam light L (the scanning surface in the emission optical system) after being reflected by the reflection mirror 24 is also on the XY plane. Thus, as the primary surface of the mirror substrate 232 in the MEMS mirror 23 is parallel to the scanning surface in the emission optical system, the optical scanning apparatus 100 may be reduced in thickness as much as possible.

In a typical layout of a conventional optical scanning apparatus using a MEMS mirror as a deflection mirror, the primary surface of a mirror substrate is perpendicular to a scanning surface in an emission optical system; however, in this case, the thickness of the optical scanning apparatus is determined by the size of the mirror substrate in the MEMS mirror. Conversely, in the optical scanning apparatus 100 according to the present embodiment, the thickness thereof is not determined by the size of the mirror substrate 232.

Furthermore, according to the present embodiment, the optical axis of the beam light L before being deflected by the drive mirror 231 and the optical axis of the central scanning light of the beam light L after being deflected by the drive mirror 231 are included in the same YZ plane (the YZ plane that is the center of the scanning area). Therefore, according to the present embodiment, all the optical components included in the optical scanning apparatus 100 may be symmetrically positioned with respect to the YZ plane that is the center of the scanning area. Thus, it is easy to position the optical components in the optical scanning apparatus 100 with high accuracy.

Second Embodiment

Figure 6:
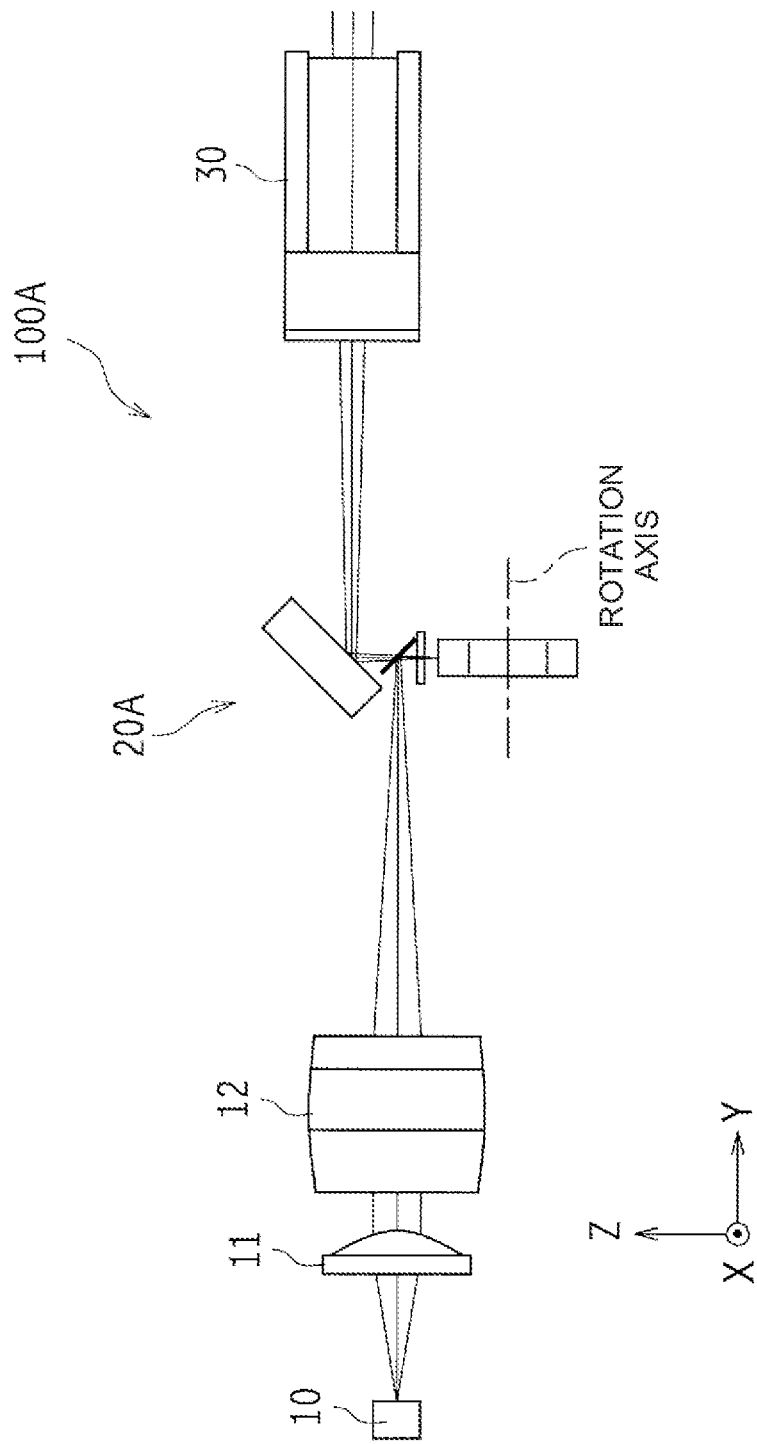
FIG. 6 is a side view schematically illustrating an optical system of an optical scanning apparatus according to a second embodiment.

In the configuration illustrated according to the first embodiment, the MEMS mirror 23 is used as the deflection mirror of the optical scanning apparatus 100. However, the present invention is not limited thereto, and a polygon mirror may be used as the deflection mirror. FIG. 6 is a side view schematically illustrating an optical system of an optical scanning apparatus 100A according to a second embodiment.

The optical scanning apparatus 100A illustrated in FIG. 6 has a configuration including a beam deflector 20A instead of the beam deflector 20 in the optical scanning apparatus 100 of FIG. 3. The beam deflector 20A includes a polygon mirror 25 as a deflection mirror instead of the MEMS mirror 23 of FIG. 3. In the optical scanning apparatus 100A, the rotation axis of the polygon mirror 25 is arranged in a direction (i.e., the Y-axis direction) parallel to the optical axis of the beam light L immediately before being reflected by the first polarizing member 21 as is the case with the drive mirror 231 of the MEMS mirror 23. Thus, the optical scanning apparatus 100A may maximize the effective area of the reflection surface of the polygon mirror 25, ensure a vignetting margin, and minimize a bow, as in the optical scanning apparatus 100 according to the first embodiment.

Third Embodiment

In the optical scanning apparatus 100 of FIG. 3, the beam light L emitted from the light source 10 includes the s-polarization component and the p-polarization component, only the s-polarization component reflected by the first polarizing member 21 is used as a scanning light for the scanned object, and the p-polarization component passed through the first polarizing member 21 is not used as a scanning light. For this reason, it is necessary to prevent the p-polarization component having passed through the first polarizing member 21 from passing through the emission optical system and being emitted from the optical scanning apparatus 100.

Figure 7:
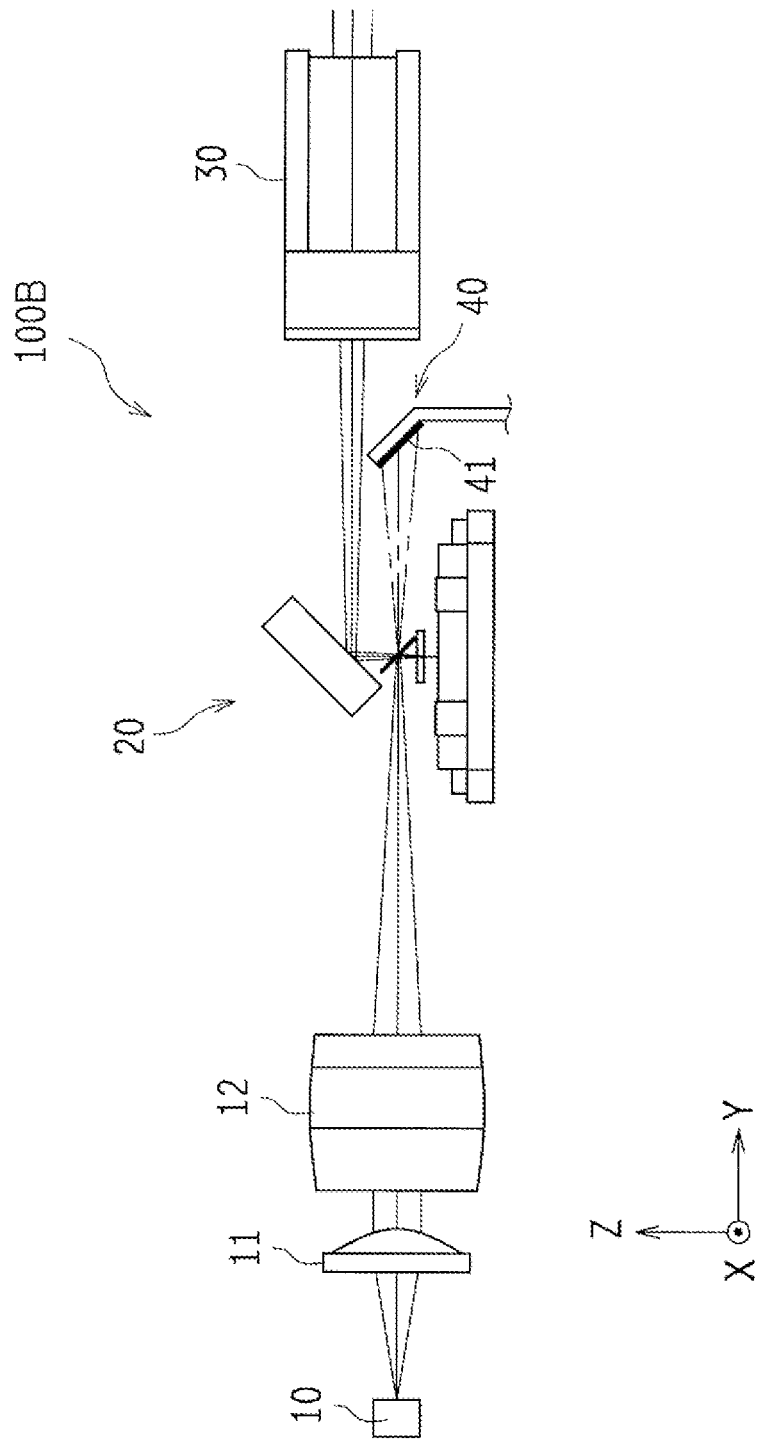
FIG. 7 is a side view schematically illustrating an optical system of an optical scanning apparatus according to a third embodiment.

FIG. 7 is a side view schematically illustrating an optical system of an optical scanning apparatus 100B according to a third embodiment. The optical scanning apparatus 100B illustrated in FIG. 7 has a configuration substantially similar to that of the optical scanning apparatus 100 of FIG. 3 but includes a light shield 40 that blocks the p-polarization component at the destination of the p-polarization component passed through the first polarizing member 21. In the optical scanning apparatus 100B, there is a difference in level in the Z-axis direction between the optical axis of the beam light L before entering the first polarizing member 21 and the optical axis of the beam light L after being reflected by the reflection mirror, and therefore the light shield 40 may use this difference in level to block the p-polarization component passed through the first polarizing member 21. The light shield 40 may have a configuration such that, for example, a rib is provided in a chassis of the optical scanning apparatus 100B and the rib is used to block the p-polarization component passed through the first polarizing member 21. By providing the light shield 40, it is possible to prevent the p-polarization component passed through the first polarizing member 21 from passing through the emission optical system and being emitted from the optical scanning apparatus 100.

Furthermore, the incidence surface of the light shield 40 for the p-polarization component may be configured to reduce the reflection of the p-polarization component by forming microscopic irregularities or providing a reflection reducing member 41 formed of a suede material, or the like. Reduction of the reflection of the p-polarization component by the light shield 40 may prevent the p-polarization component from being scattered to become stray light. Alternatively, the incidence surface of the light shield 40 for the p-polarization component may be inclined with respect to the optical axis of the p-polarization component so that the p-polarization component scattered by the light shield 40 travels toward an inner wall of the chassis of the optical scanning apparatus 100B (do not travel toward the emission optical system).

Fourth Embodiment

In the illustrated configuration of the beam deflector 20 in FIG. 5, the first polarizing member 21, the second polarizing member 22, and the reflection mirror 24, which are separate members from each other, are arranged to have a predetermined positional relationship. However, the present invention is not limited thereto, and at least two of the first polarizing member 21, the second polarizing member 22, and the reflection mirror 24 may be integrally configured by using a prism, or the like.

Figure 8:
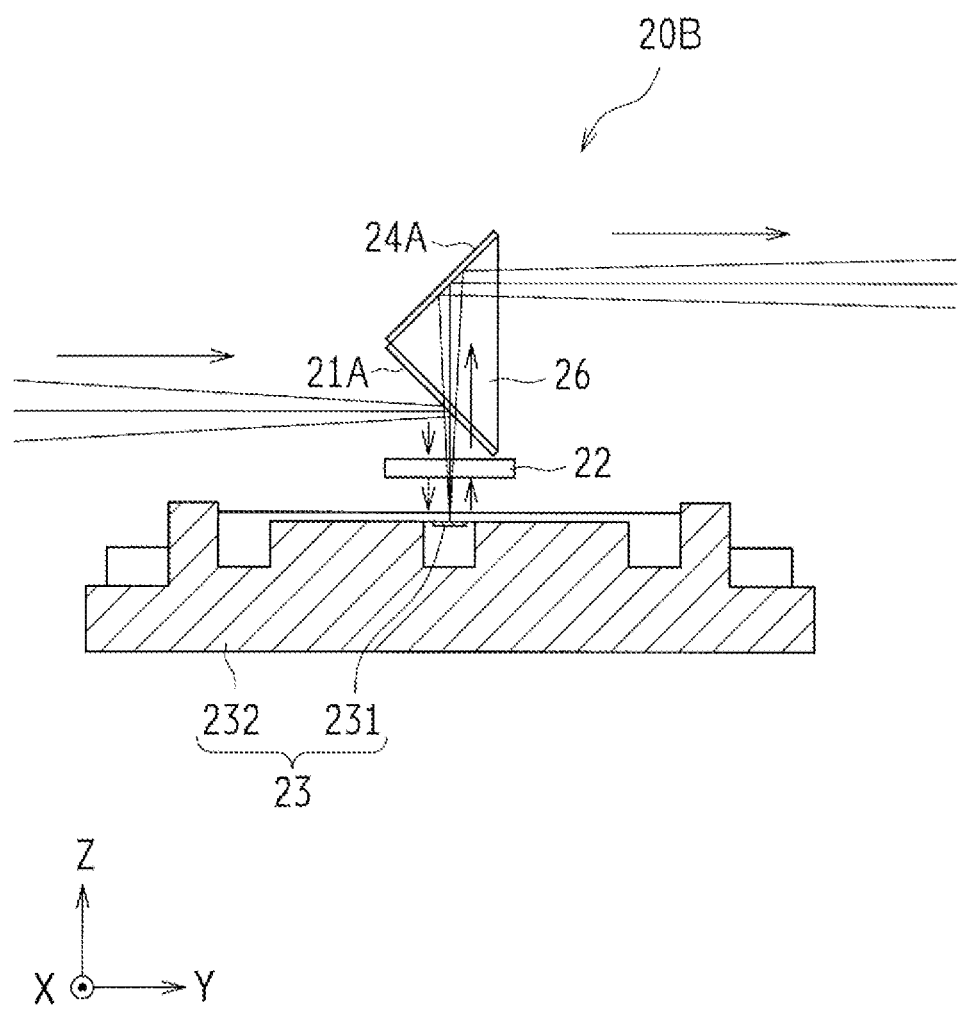
FIG. 8 is a cross-sectional view of a beam deflector that is an example of a configuration according to a fourth embodiment.

FIG. 8 is a cross-sectional view of a beam deflector 20B that is an example of the configuration according to a fourth embodiment. The beam deflector 20B uses a triangular prism 26 to have a configuration such that one surface of the triangular prism 26 is coated with a dielectric multi-layer film 21A functioning as a first polarizing member (or has a wire grid polarizing film attached thereto) and another surface of the triangular prism 26 is provided with a mirror coat 24A functioning as a reflection mirror. With this configuration, the first polarizing member and the reflection mirror may be formed as an integral prism, and the arrangement, or the like, of members during the assembly of the beam deflector 20B is facilitated.

Figure 9:
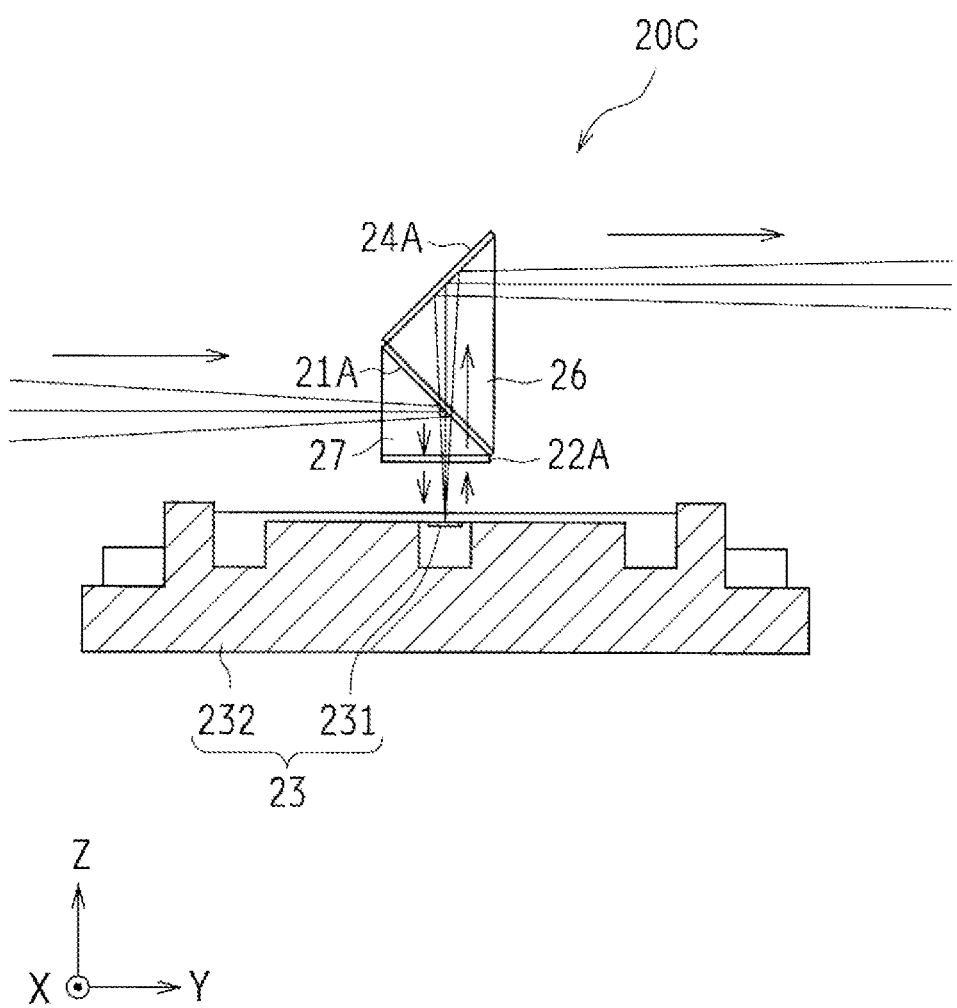
FIG. 9 is a cross-sectional view of a beam deflector that is another example of the configuration according to the fourth embodiment.

FIG. 9 is a cross-sectional view of a beam deflector 20C that is another example of the configuration according to the fourth embodiment. The beam deflector 20C uses the triangular prism 26 and a triangular prism 27 and, as is the case with the beam deflector 20B, has a configuration such that one surface of the triangular prism 26 is coated with the dielectric multi-layer film 21A and another surface of the triangular prism 26 is provided with the mirror coat 24A. Further, in the beam deflector 20C, one surface of the triangular prism 27 is provided so as to be in contact with the dielectric multi-layer film 21A (so as to sandwich the dielectric multi-layer film 21A between the triangular prism 26 and the triangular prism 27), and a quarter wavelength plate 22A functioning as a second polarizing member is attached to another surface of the triangular prism 27. With this configuration, the first polarizing member, the second polarizing member, and the reflection mirror may be formed as an integral prism, and the arrangement, or the like, of members during the assembly of the beam deflector 20C is facilitated. Although not illustrated, it is also possible to form the first polarizing member and the second polarizing member as an integral prism by using only the triangular prism 27.

Other Embodiments

The embodiments disclosed herein are illustrated as examples in all respects and do not serve as a basis for a limited interpretation. Therefore, the technical scope of the present invention is not interpreted based on only the above-described embodiments but are defined based on the description in claims. Furthermore, the technical scope of the present invention includes all the modifications within the meaning and the scope equivalent to the claims.

For example, in the description of the embodiments, the beam light L emitted from the emission lens 30 for scanning is the p-polarization component, but the optical system may be configured for scanning with the s-polarization component. In this case, for example, the first polarizing member is installed in an orientation to reflect the p-polarization component included in the beam light L and pass the s-polarization component.

In the description of the embodiments, the optical scanning apparatus is applied to the image forming apparatus; however, the application of the optical scanning apparatus is not limited to the image forming apparatus and may be applied to other various applications. For example, the optical scanning apparatus may be applied to an image display device such as a projector or a display that displays an image due to optical scanning.

What is claimed is:

1. An optical scanning apparatus comprising:
a light source that emits a beam light including a first polarization component;
a deflection mirror that is rotationally driven so as to reflect the beam light toward a scanned object while scanning in a main scanning direction;
a first polarizing member that reflects the first polarization component included in the beam light toward the deflection mirror and passes a second polarization component having a phase difference of a half-wavelength with respect to the first polarization component; and
a second polarizing member that causes a phase difference of a quarter wavelength to the passing beam light, wherein
the first polarizing member is provided such that the beam light reflected by the first polarizing member squarely enters the deflection mirror from substantially a center of a deflection angle of the deflection mirror,
the second polarizing member is provided between the first polarizing member and the deflection mirror to pass the first polarization component of the beam light reflected by the first polarizing member therethrough twice before and after being reflected by the deflection mirror so as to change the first polarization component into the second polarization component, and
a rotation axis of the deflection mirror is parallel to an optical axis of the beam light immediately before being reflected by the first polarizing member.

2. The optical scanning apparatus according to claim 1, further comprising a reflection mirror that is provided on an opposite side of the second polarizing member and the deflection mirror with respect to the first polarizing member to reflect the beam light such that an optical axis of a central scanning light of the beam light having passed through the first polarizing member after passing through the second polarizing member twice is parallel to an optical axis of the beam light immediately before being reflected by the first polarizing member.

3. The optical scanning apparatus according to claim 1, further comprising a light shield that blocks the second polarization component included in the beam light emitted by the light source and passing through the first polarizing member before being reflected by the deflection mirror.

4. The optical scanning apparatus according to claim 3, wherein the first polarizing member and the reflection mirror are formed as an integral prism in which a dielectric multi-layer film is formed on one surface of a triangular prism and a mirror coat is formed on another surface of the triangular prism.

5. The optical scanning apparatus according to claim 1, wherein the first polarizing member and the second polarizing member are formed as an integral prism in which a dielectric multi-layer film is formed on one surface of a triangular prism and a quarter wavelength plate is attached to another surface of the triangular prism.

6. The optical scanning apparatus according to claim 1, wherein the deflection mirror is a micro-electro-mechanical systems mirror.

7. An image forming apparatus comprising the optical scanning apparatus according to claim 1.

* * * * *